(12) United States Patent
Bode et al.

(10) Patent No.: US 7,575,422 B2
(45) Date of Patent: Aug. 18, 2009

(54) COMPRESSOR UNIT

(75) Inventors: Ralf Heinrich Bode, Moers (DE); Klaus Mecking, Dusseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 483 days.

(21) Appl. No.: 10/531,405

(22) PCT Filed: Oct. 13, 2003

(86) PCT No.: PCT/NL03/00692

§ 371 (c)(1),
(2), (4) Date: Apr. 14, 2005

(87) PCT Pub. No.: WO2004/036052

PCT Pub. Date: Apr. 29, 2004

(65) Prior Publication Data

US 2006/0292019 A1 Dec. 28, 2006

(30) Foreign Application Priority Data

Oct. 15, 2002 (NL) .................................. 1021656

(51) Int. Cl.
*F04B 35/04* (2006.01)

(52) U.S. Cl. .............................. 417/423.12; 417/423.1; 417/423.7; 417/423.14

(58) Field of Classification Search .............. 417/423.1, 417/423.7, 423.12, 423.14, 423, 7
See application file for complete search history.

(56) References Cited

U.S. PATENT DOCUMENTS

| | | | | |
|---|---|---|---|---|
| 3,951,573 A * | 4/1976 | Dunning et al. | ........ | 417/423.13 |
| 3,960,468 A | 6/1976 | Boorse et al. | | |
| 5,698,917 A * | 12/1997 | Shultz | ......................... | 310/87 |
| 6,336,986 B1 * | 1/2002 | Lee et al. | ..................... | 156/172 |
| 6,350,109 B1 * | 2/2002 | Brunet et al. | ................ | 417/365 |
| 6,418,927 B1 * | 7/2002 | Kullik | .................... | 128/204.18 |
| 6,464,469 B1 | 10/2002 | Grob et al. | | |
| 7,156,627 B2 * | 1/2007 | Lenderink et al. | ......... | 417/423.8 |

FOREIGN PATENT DOCUMENTS

| | | | |
|---|---|---|---|
| DE | 10 97 543 | | 1/1961 |
| DE | 93 03 934 | | 7/1994 |
| DE | 19904119 | A1 * | 8/2000 |
| EP | 0 255 723 | | 2/1988 |
| EP | 0 678 964 | | 10/1995 |
| EP | 0 990 798 | | 4/2000 |
| NL | 1018212 | C * | 10/2002 |
| WO | WO 2099286 | A1 * | 12/2002 |

OTHER PUBLICATIONS

European Patent Abstract for EP0678964 (A1); Publication Date: Oct. 25, 1995; Inventor Hansjuerg, Gysin.*

* cited by examiner

*Primary Examiner*—Devon C Kramer
*Assistant Examiner*—Leonard J Weinstein

(57) ABSTRACT

A compressor unit including a centrifugal compressor for compressing a gas and an electric motor with a stator and a rotor for driving the compressor. The compressor and the electric motor are accommodated in a common gastight housing, provided with a gas inlet and a gas outlet.

The stator is accommodated in a separate stator space which is delimited by a wall section, surrounding the stator, of the housing, a gastight partition which extends freely between the stator and the rotor of the electric motor, and at least one end wall which extends between the partition and the housing of the compressor unit.

The partition is of a material of such high strength that it remains clear of the stator and the rotor under working pressures of the gas.

11 Claims, 3 Drawing Sheets

COMPRESSOR UNIT

CROSS-REFERENCE TO RELATED APPLICATION

This is a U.S. National Phase application of PCT/NL2003/000692, which PCT application claims priority of Dutch patent application number 1021656 filed Oct. 15, 2002, both herein incorporated by reference.

FIELD OF THE INVENTION

The invention relates to a compressor unit having a common housing for electric motor and compressor.

BACKGROUND OF THE INVENTION

A compressor unit is known from U.S. Pat. No. 3,960,468, which discloses a compressor unit for compressing a gas. The compressor unit comprises a centrifugal compressor and an electric motor. The electric motor comprises a stator and a rotor, the rotor driving the compressor. The compressor and the electric motor are accommodated in a common gastight housing which is provided with a gas inlet and a gas outlet.

In the compressor unit shown in FIG. 1 of U.S. Pat. No. 3,960,468, there is a thin partition between the space in which the stator is located and the space in which the rotor is located. A partition of this type ensures that any aggressive substances which may be present in the gas which is to be compressed cannot reach the stator space, where they could attack the stator. This known partition is thin and may be made from a metal with a high electrical resistance or from a nonconductive material. As can be seen from FIG. 1, the known partition is supported on the stator.

The known partition has various drawbacks. Firstly, the partition may cause wear to itself and to the stator. Wear of this type occurs when the partition and the stator move with respect to one another as a result of fluctuating pressures and/or temperatures. Secondly, the known partition is unable to absorb high pressure differences between the stator space and the rotor space. To the extent that the partition is able to absorb pressure differences, this is attributable to the support on the stator, and not to the properties of the partition itself.

SUMMARY OF THE INVENTION

The object of the present invention is to provide a compressor unit in which these drawbacks are at least partially overcome, or to create a usable alternative.

In particular, it is an object of the invention to provide a compressor unit, provided with a partition, which is able to absorb relatively high pressure differences and which does not cause any wear to itself and/or to the stator.

According to the invention, this object is achieved by means of the compressor unit described herein.

The stator space is delimited by a wall section, surrounding the stator, of the common housing of the compressor unit, a gastight partition and at least one end wall, which connects the partition in a gastight manner to the housing of the compressor unit. With this, the housing of the compressor unit may be shaped in such a manner that it fulfils the function of an end wall on one or two sides of the stator. The gastight partition not only keeps the stator space free of the gas, but also ensures that a different pressure can prevail in the stator space compared to the working pressures which are present in the compressor. The gastight partition extends freely between the stator and the rotor, with the result that it does not touch the stator and the rotor. This orientation of the partition has the advantage that the stator and the partition can expand and contract independently of one another under the influence of temperature changes without scraping along one another, which could otherwise cause wear. The partition is made from a material which is sufficiently strong for the deformation of the partition resulting from tensile stress which is produced from the working pressure of the compressor to be sufficiently low for the partition to remain clear of both the stator and the rotor.

In particular, the partition is made at least in part from a fibre-reinforced plastic. This material can be processed to low wall thicknesses but undergoes only a small amount of deformation under high tensile stress.

More particularly, the partition comprises an erosion-resistant layer on the rotor side. This layer protects the partition from erosion by the gas itself, by any aggressive and abrasive components in the gas and/or by high temperatures of the gas.

In a variant, the partition comprises a gastight layer, making it possible for only part of the overall cross section of the partition to consist of a gastight material.

The partition advantageously comprises a layer of corrosion-free metal. Using metal in the partition makes the latter gastight and—if this layer is used on the rotor side—resistant to erosion.

In a variant, the partition comprises a layer of polyarylether-ketone. Polymers from this group are able to withstand high temperatures, are abrasion-resistant, are resistant to wear and are a poor conductor of electricity.

Further embodiments are defined in the subclaims.

The invention also relates to a method for producing a partition for a compressor unit. In this method, at least an inner layer and an outer layer are produced separately in the form of an inner shell and an outer shell. After the inner and outer shells have been produced, the external diameter of the inner shell, under the same pressure and temperature, is larger than the internal diameter of the outer shell. To allow the inner shell then to be introduced into the outer shell, the diameter of the outer shell is increased by using a high gas or liquid pressure. At the same time, or as an alternative, the diameter of the inner shell is temporarily reduced by lowering the temperature. The pressure is increased and/or the temperature reduced to such an extent that the external diameter of the inner shell becomes smaller than the internal diameter of the outer shell. Then, the inner shell can be pushed into the outer shell, after which the pressure and temperature are restored to normal levels. As a result, the inner shell will expand and/or the outer shell will contract, so that the inner shell is clamped into the outer shell under stress.

Finally, the invention relates to the use of the compressor unit described herein.

BRIEF DESCRIPTION OF THE DRAWINGS

The invention will be explained in more detail in the following description of an embodiment of the compressor unit according to the invention with reference to the drawings, in which.

DESCRIPTION OF PREFERRED EMBODIMENTS

Figure 1:
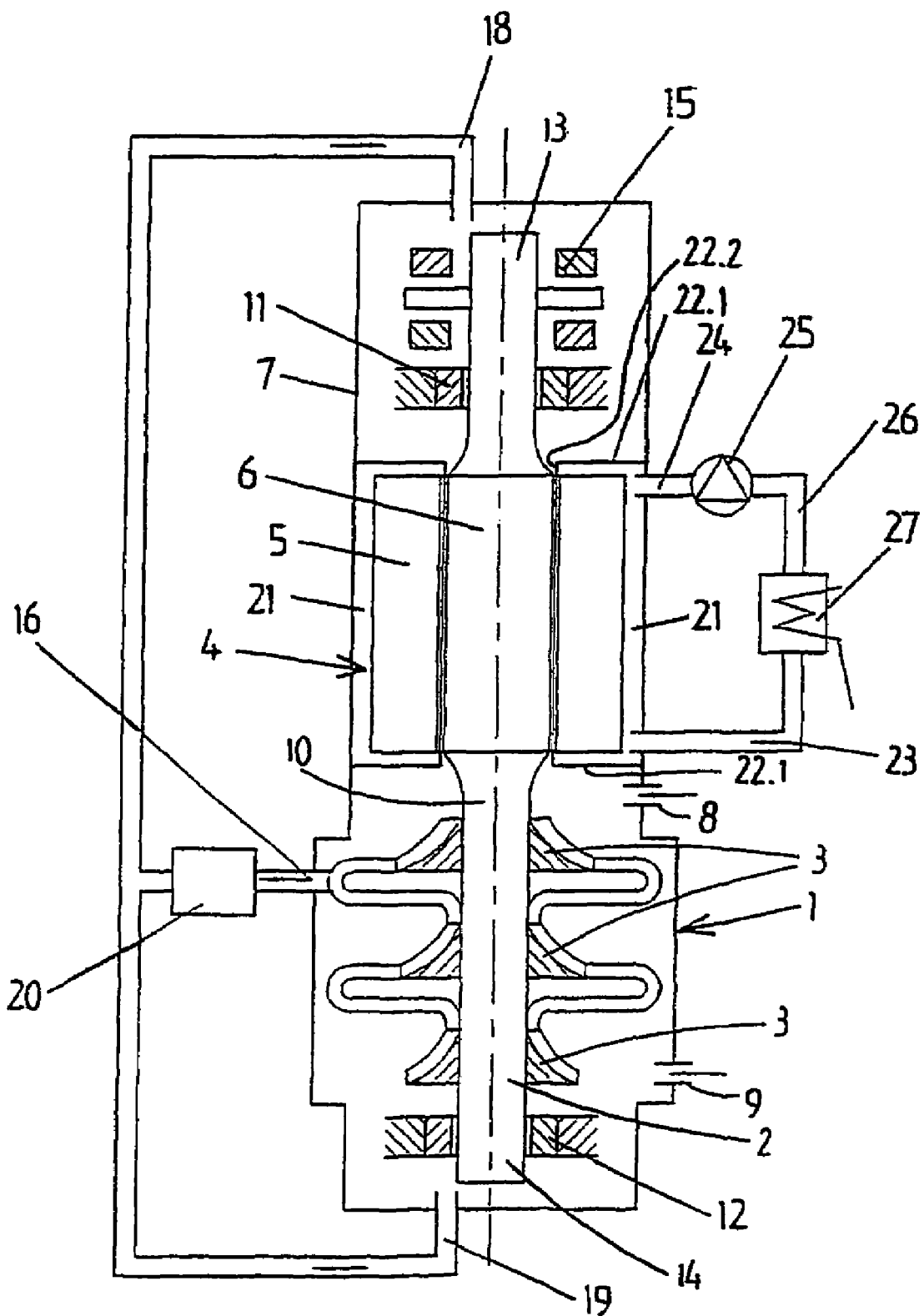
FIG. 1 diagrammatically depicts an embodiment of the compressor unit according to the invention.

The compressor unit illustrated in FIG. 1 comprises a centrifugal compressor 1 for compressing a gas, for example process gas, having a rotor 2 with one or more, in this case three, compressor impellers 3 and an electric motor 4 having a stator 5 and a rotor 6 for driving the rotor 2 of the compressor. The compressor 1 and the electric motor 4 are accommodated in a common gastight housing 7 which is provided with a gas inlet 8 and a gas outlet 9.

The rotor 2 of the compressor 1 and the rotor 6 of the electric motor 4 are arranged on a common rotor shaft 10 comprising one single unit. The rotor shaft 10 is mounted in two magnetic radial bearings 11 and 12, which are each arranged in the vicinity of an end 13 and 14, respectively, of the rotor shaft 10, and a magnetic axial bearing 15 arranged in the vicinity of the radial bearing 11.

The compressor unit is provided with a cooling system for cooling the magnetic bearings 11, 12, 15 and the rotor 6 of the electric motor 4. This cooling system comprises a passage 16 which runs from the compressor and branches into passages 18 and 19 running to the magnetic bearings 11, 12, 15. A filter 20 is incorporated in the passage 16 running from the compressor. To cool the rotor 6 of the electric motor 4 and the magnetic bearings 11, 12, 15, compressed gas is tapped off in an intermediate stage of the compressor 1 and passed through the passage 16 and the filter 20 before being fed in metered fashion, via the passages 18 and 19, to the magnetic bearings 11 and 15, and 12, respectively. The cooling gas is collected again inside the compressor unit and passed to the inlet section of the compressor.

The stator 5 of the electric motor 4 is accommodated in a stator space 21 which is separate from the remainder of the interior of the compressor unit and is delimited by the wall section, surrounding the stator 5, of the housing 7 of the compressor unit, an end wall 22.1 which adjoins this wall section and extends in the radial direction on both sides of the stator 5, and a partition 22.2 which extends between the stator 5 and the rotor 6 of the electric motor 4. The stator space 21 is provided with a feed 23 and a discharge 24 for a separate cooling medium, such as a gas or liquid, which is circulated in a cooling circuit 26 by a pump 25. A heat exchanger 27 is incorporated in the cooling circuit 26. The pressure in the cooling circuit 26 and the stator space 21 is on average approximately 4 bar.

Figure 2:
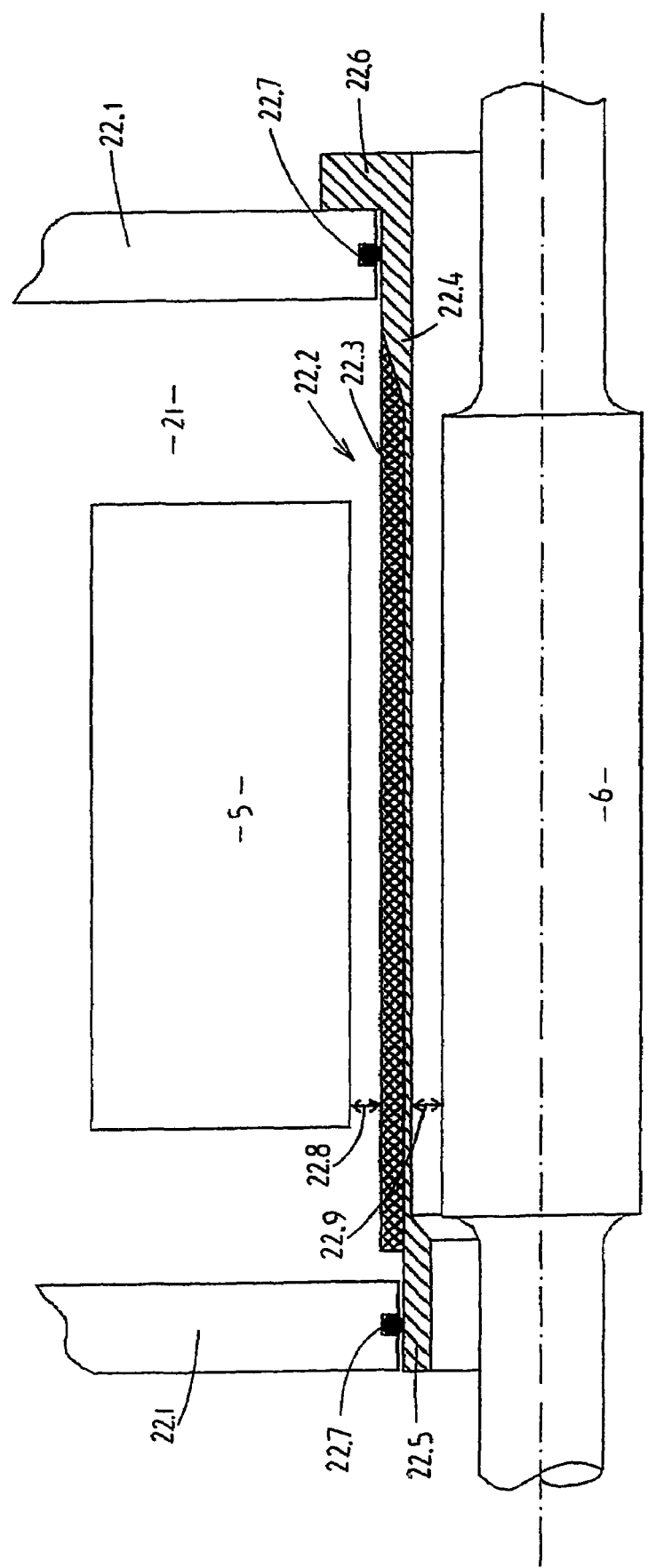
FIG. 2 shows a partition between a rotor and a stator in more detail.

The partition 22.2 comprises a plastic layer reinforced with carbon fibres (carbon reinforced plastics, CRP) 22.3 and a metallic layer 22.4, for example a stainless steel or Inconel, in particular Inconel 625 (cf. FIG. 2). The metallic layer 22.4 thickens to form a closure ring 22.5 for reinforcement purposes at the location of the connection to a first of the end walls 22.1. Similarly, the metallic layer 22.4 thickens to form a stop 22.6 at the location of the connection to the second end wall 22.1. The connection between the partition 22.2 and the two end walls 22.1 is made gastight by two or more compressible sealing rings 22.7.

The partition 22.2 extends freely between the stator 5 and the rotor 6, i.e. the partition 22.2 is located at a distance from the stator 5 and the rotor 6. There is a gap or clearance 22.8 between the radially outer side of the partition 22.2 and the stator 5, and there is a gap or clearance 22.9 between the radially inner side of the partition 22.2 and the rotor 6.

The partition 22.2 imparts its strength in particular to the CRP layer 22.3. This material is so strong that with a wall thickness of, for example, 4 mm and a diameter around the rotor 6 of partition 22.2 of 350 mm it is subject to a maximum radial deformation of the order of 0.5 mm under a compressor pressure which may rise to as high as over 150 bar. As a result of the clearance 22.8 between the stator 5 and the partition 22.2 being selected to be larger than the maximum deformation of the CRP, the partition 22.2 will remain clear of the stator 5 and the rotor 6 under all operating conditions. Also, the partition 22.2 will not scrape along the stator 5 if it moves with respect to the stator 5 as a result of uneven expansion caused by an increase in temperature.

The CRP or a protective layer arranged thereon is able to withstand the chemical action of the cooling medium which is located in the stator space 21. The metallic layer 22.4 is able to withstand the action of the process gas, while both layers are able to withstand high temperatures which in the compressor may rise to over 180° C. On account of the fact that the metallic layer 22.4 is only very thin at the location of the stator 5 and the rotor 6, in particular of the order of 1 mm, on account of the fact that the CRP layer 22.3 is magnetically highly transmissive, and on account of the fact that the total distance between the stator 5 and the rotor 6 is small due to the small wall thickness of the partition 22.2 and the small clearances 22.8 and 22.9, the electrical losses are limited.

Figure 3:
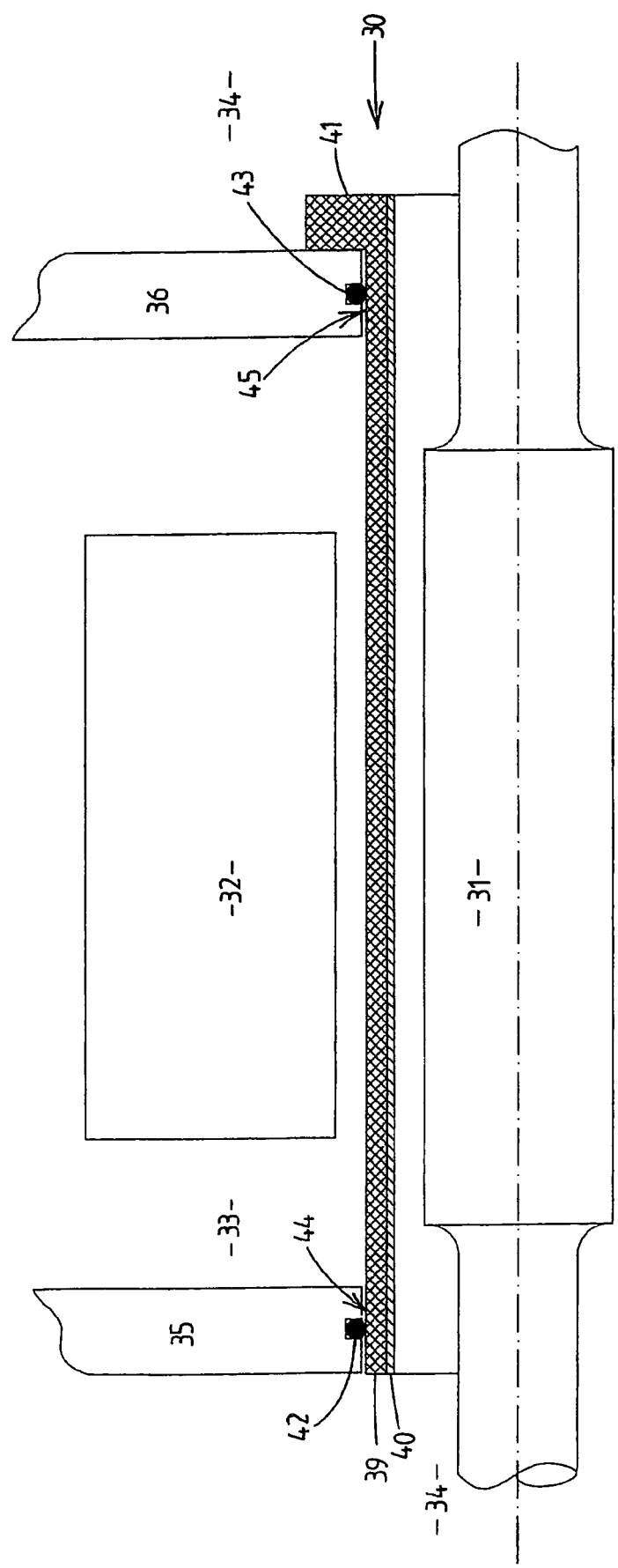
FIG. 3 shows a detailed view of a partition between a rotor and a stator in accordance with an alternative embodiment.

FIG. 3 shows an alternative embodiment for a partition 30 between a rotor 31 and a stator 32. A rotor 31 and stator 32 of this type together form an induction motor which can be used, for example, in a compressor unit as shown in FIG. 1. The stator 32 is accommodated in a separate stator space 33 which is separated from a rotor space 34 by a first end wall 35, a second end wall 36 and the partition 30. In the stator space 33 there is a cooling medium, for example a cooling liquid, which is circulated by means of a pump (not shown).

The partition 30 is composed of an outer epoxy layer 39 reinforced with carbon fibres and an inner layer 40, formed from an erosion-resistant polymer. This polymer is of the polyaryl-etherketone type and in particular comprises the repeat unit: oxy-1,4-phenylene-oxy-1,4-phenylene-carbonyl-1,4-phenylene, also known by the trade name PEEK. The radially outer layer 39 extends in the axial direction from the first end wall 35 to beyond the second end wall 36. A raised edge or flange 41, which in use bears against the end wall 36, is formed beyond the second partition 36. The partition 30 is closed off in a gastight manner with respect to the end walls 35 and 36 by means of sealing rings 42 and 43, respectively. At the location of the sealing rings 42 and 43, the radially outer side of the outer layer 39 is provided with nickel 44, 45 to protect against wear. Therefore, the partition 30 can expand and contract in the axial direction with respect to the end walls 35 and 36, with a gastight closure of the stator space 33 with respect to the rotor space 34 being retained by virtue of the sealing rings 42 and 43.

As an alternative, the partition 30 may also be provided with an end ring, or flange, at its second axial end. In this case, the axial length of the partition 30 can be selected in such a manner that the partition 30 is secured to the end walls 35 and 36 under prestress. This prestress may be selected in such a manner that the partition 30 will not expand under the pressures and temperatures which occur, with the result that the partition 30 does not move with respect to the end walls 35 and 36 at the location of the seal 42 and 43.

The carbon fibre-reinforced layer 39 is sufficiently strong for the deformation which it undergoes under high pressure differences between the rotor space 34 and the stator space 33 to be so slight that it remains clear of both the rotor 31 and the stator 32, i.e. there is always a gap or clearance between the rotor 31 and the radially inner side of the partition 30 and between the stator 32 and the radially outer side of the partition 30. The wall thickness of the partition 30 is in this case approximately 4 mm, and it can withstand a working pressure in the rotor space 34 of the order of magnitude of 150 bar, the pressure in the stator space 33 being at most approximately 10 bar. The temperature of use may in this case vary from −40° C. to 180° C.

The inner layer 40, formed from the polymer PEEK, is resistant to erosion, is able to withstand high temperatures and the action of various aggressive chemical components, such as those which occur in, for example, natural gas. On account of its poor electrical conductivity, the erosion-resistant polymer layer 40 also has little influence on the action of the induction motor. The partition 30 described can advantageously also be used for electric motors of a different type from the induction motor shown in which it is desirable to separate the stator space from the rotor space. The electric motor can also be used with equipment other than a compressor.

The partition 30 is produced by applying the inner layer 40 around a mandrel, which functions as a mould. This application of the inner layer 40 to the mandrel can be effected, for example, by spraying. Then, a fibre-reinforced plastic, in particular a carbon fibre-reinforced epoxy, is applied to the outer side of the inner layer 40. Before the inner layer is applied to the mandrel, it is advantageous for a release agent, for example aluminium, to be applied to the mandrel. After production of the partition 30 has been completed, this release agent is dissolved, so that the partition 30 can easily be removed from the mandrel. To improve the adhesion between the inner layer 40 and the outer layer 39, it is possible for the outer surface of the inner layer 40, prior to application of the outer layer 39, to be pretreated, for example by chemical activation. It is advantageous for a thin layer of epoxy to be applied around the inner layer 40 first of all. In this case, carbon fibres are then wound around it, which fibres have previously, at the same time or subsequently been impregnated with or immersed in epoxy. The method described can advantageously also be used to produce other fibre-reinforced plastic objects which are to be provided with a polymer layer, such as PEEK.

In addition to the embodiment shown, numerous variants are possible. For example, the compressor and the electric motor may be accommodated in a gastight housing in a different way, in which case, for example, compressor impellers are located on both sides of the electric motor.

It is also possible to use different cooling systems for the rotor of the electric motor, for the compressor and for the stator space, such as internal cooling of the stator and rotor.

Furthermore, the partition may be composed of more or fewer than two layers. If one layer is used, it is possible to select or put together a material which is gastight, erosion-resistant and strong. In the case of three layers, the material of each layer can be selected specifically for one of these functions. It is also possible for the partition and one or two of the end walls to be formed as a single piece and for the partition, end walls and compressor housing to be flexibly connected to one another in order to cope with variations in shape caused, for example, by differences in expansion under fluctuating temperature conditions.

Furthermore, various types of fibre-reinforcing materials, for example comprising glass or aramid fibres, can be used for the partition. Ceramic materials or other plastics can also be used as an erosion-resistant layer of the partition.

To summarize, the invention provides a compressor unit in which the stator of the electric motor is shielded from the action of the gas which is to be compressed by means of a partition. The thin and strong material used for the partition allows the motor to transmit a high power per unit area. The partition and/or stator will not become worn as a result of relative movements with respect to one another, since they do not touch one another. Therefore, the electric motor requires little maintenance and has a long service life.

What is claimed is:

1. A compressor unit, comprising: a multistage centrifugal compressor for compressing a gas an electric motor having a stator and a rotor for driving the multistage centrifugal compressor, the rotor being supported by a first and second magnetic radial bearings each magnetic radial bearing being arranged at opposite ends of the rotor and a magnetic thrust bearing arranged adjacent to one of the first or second magnetic radial bearings, the multistage centrifugal compressor and the electric motor being accommodated in a common gastight housing which is provided with a gas inlet and a gas outlet, the stator being accommodated and isolated from the multistage centrifugal compressor in a separate stator space, which is delimited by a toroidally shaped wall section, radially and axially surrounding the stator, of the common gastight housing of the compressor unit, a gastight partition which extends between the stator and the rotor of the electric motor, and a first end wall which extends between the gastight partition and the common gastight housing of the compressor unit and a second end wall arranged opposite the first end wall and configured to isolate the stator from the compressor in cooperation with the gastight partition and the first end wall, wherein the gastight partition extends freely between the stator and the rotor of the electric motor and comprises a material of sufficiently high strength for it to remain clear of the stator and the rotor under working pressures of the gas which may occur inside the common gastight housing, wherein the high-strength material of the gastight partition comprises a fibre-reinforced plastic.

2. A compressor unit according to claim 1, in which the gastight partition comprises an erosion-resistant layer on the rotor side.

3. A compressor unit according to claim 1, in which the gastight partition comprises a gastight layer.

4. A compressor unit according to claim 1, in which the gastight partition comprises a layer of corrosion-free metal.

5. A compressor unit according to claim 1, in which the gastight partition comprises a layer of polyaryl ether ketone.

6. A compressor unit according to claim 1 in which the wall thickness of the gastight partition is greater at the ends than in the middle.

7. A compressor unit according to claim 1, in which the gastight partition and the first and second end walls are separate parts which are connected to one another in a gastight manner by means of one or more sealing rings.

8. A compressor unit according to claim 1, in which the stator space is provided with connections to a cooling unit for supplying and discharging a cooling medium.

9. A compressor unit according to claim 1, in which the gastight partition comprises a separate inner layer and outer layer, on the rotor and stator side, respectively, at least the inner layer having erosion-resistant properties, at least one layer having a high strength and at least one layer being gastight.

10. A method of producing a gastight partition for a compressor unit, the compressor unit comprising a multistage centrifugal compressor for compressing a gas and an electric motor having a stator and a rotor for driving the multistage centrifugal compressor, the rotor being supported by a first and second magnetic radial bearings each magnetic radial bearing being arranged at opposite ends of the rotor and a magnetic thrust bearing arranged adjacent to one of the first and second magnetic radial bearings, the multistage centrifugal compressor and the electric motor being accommodated in a common gastight housing which is provided with a gas inlet and a gas outlet, the stator being accommodated in a separate stator space, which is delimited by a wall section, surrounding the stator, of the common gastight housing of the compressor unit, a gastight partition which extends between the stator and the rotor of the electric motor, and at least one end wall which extends between the gastight partition and the common gastight housing of the compressor unit, wherein the gastight partition extends freely between the stator and the rotor of the electric motor and comprises a material of sufficiently high strength for it to remain clear of the stator and the rotor under working pressures of the gas which may occur inside the common gastight housing, wherein the high-strength material of the gastight partition comprises a cured fibre-reinforced plastic, in which the gastight partition comprises a separate inner layer and outer layer on the rotor and stator side, respectively, at least the inner layer having erosion-resistant properties, at least one layer having a high strength and at least one layer being gastight, the method comprising:

producing the inner layer and outer layer separately, in the form of an inner shell and an outer shell, the external diameter of the inner shell, under the same pressure and temperature, being larger than the internal diameter of the outer shell;

temporarily increasing the diameter of the outer shell by means of gas or liquid pressure, or temporarily reducing the diameter of the inner shell by lowering the temperature of the inner shell, so that it is possible to push the inner shell into the outer shell; and restoring the diameter of the outer or inner shell by restoring the pressure of the outer shell or restoring the temperature of the inner shell.

11. The multistage centrifugal compressor, the rotor being supported by a first and second magnetic radial bearings each magnetic radial bearing being arranged at opposite ends of the rotor and a magnetic thrust bearing arranged adjacent to one of the first or second two magnetic radial bearings, the multistage centrifugal compressor and the electric motor being accommodated in a common gastight housing which is provided with a gas inlet and a gas outlet, the stator being accommodated and isolated from the multistage centrifugal compressor in a separate stator space, which is delimited by a wall section, radially and axially surrounding the stator, of the common gastight housing of the compressor unit, a gastight partition which extends between the stator and the rotor of the electric motor, and a first end wall which extends between the gastight partition and the common gastight housing of the compressor unit and a second end wall arranged opposite the first end wall and configured to isolate the stator from the compressor in cooperation with the gastight partition and the first end wall, wherein the gastight partition extends freely between the stator and the rotor of the electric motor and comprises a material of sufficiently high strength for it to remain clear of the stator and the rotor under working pressures of the gas which may occur inside the common gastight housing, wherein the high-strength material of the gastight partition comprises a fibre-reinforced plastic, the method comprising:

compressing gas using the compressor unit.

* * * * *